(12) United States Patent
Moine et al.

(10) Patent No.: US 9,482,251 B2
(45) Date of Patent: Nov. 1, 2016

(54) CLAMP ON A ROPE EQUIPPED WITH AN IMPROVED SPRING-LOADED CAM

(71) Applicant: ZEDEL, Crolles (FR)

(72) Inventors: Julien Moine, La Terrasse (FR); Alain Maurice, Saint Hilaire du Touvet (FR); Benoît Vuillermoz, Saint-Martin-d'Hères (FR)

(73) Assignee: ZEDEL, Crolles (FR)

(*) Notice: Subject to any disclaimer, the term of this patent is extended or adjusted under 35 U.S.C. 154(b) by 0 days.

(21) Appl. No.: 15/062,305

(22) Filed: Mar. 7, 2016

(65) Prior Publication Data

US 2016/0258457 A1 Sep. 8, 2016

(30) Foreign Application Priority Data

Mar. 5, 2015 (FR) ...................... 15 51856

(51) Int. Cl.
*F16B 2/18* (2006.01)
*F16B 2/06* (2006.01)

(52) U.S. Cl.
CPC .................. *F16B 2/185* (2013.01); *F16B 2/06* (2013.01); *Y10T 24/394* (2015.01)

(58) Field of Classification Search
CPC ............ Y10T 24/396; Y10T 24/3942; Y10T 24/3944; Y10T 24/3947; Y10T 24/3949; Y10T 24/3951; F16B 2/18; F16B 2/158; F16B 2/02; F16B 2/06; F16G 11/00; F16G 11/04

See application file for complete search history.

(56) References Cited

U.S. PATENT DOCUMENTS

| 3,852,943 | A | 12/1974 | Healy |
| 5,146,655 | A | 9/1992 | Gibbs |
| 7,076,844 | B2 * | 7/2006 | Skyba ..................... F16G 11/10 24/134 R |
| 2010/0126802 | A1 | 5/2010 | Delaittre et al. |

FOREIGN PATENT DOCUMENTS

| EP | 2 191 870 A1 | 6/2010 |
| WO | 2012/164279 A2 | 12/2012 |

* cited by examiner

*Primary Examiner* — Abigail Morrell
(74) *Attorney, Agent, or Firm* — Oliff PLC

(57) ABSTRACT

The invention relates to a clamp with a cam, and with a removable pivot-pin, wherein the bias spring is integrated in a housing of the cam by means of a securing cassette configured to position the spring in a pre-stressed state. The cassette is provided with clip-fastening means designed to be fitted in the housing of the lever.

7 Claims, 5 Drawing Sheets

CLAMP ON A ROPE EQUIPPED WITH AN IMPROVED SPRING-LOADED CAM

BACKGROUND OF THE INVENTION

The invention relates to a clamp on a rope comprising:
a U-shaped body equipped with a trough for passage of the rope,
an actuating lever having an aperture for attaching a safety means, and a cam for jamming the rope, said lever being housed in the trough by means of a removable pin,
and a bias spring biasing the cam towards the rope.

STATE OF THE ART

Known clamps of the kind mentioned comprise a U-shaped flange forming a trough, a lever with a blocking cam, and a removable pin enabling the clamp to be fitted or removed at any point of the rope. The lever and the detached pin remain joined to the body of the clamp by a flexible link to render them captive after the pin has been removed. Return of the cam in the direction of the rope is performed by flexible biasing means, for example by flexion of a cable, or by the action of a torsion or traction spring. The fitting and removal operations of these flexible biasing means are not easy for the user to perform with a clamp with a removable pin.

In another type of clamp with a cam, the pivot-pin remains secured in place on the cam, and it is the cam and pivot-pin assembly that is extractable from the trough after a locking system has been unlatched releasing the opposite ends of the pivot-pin. Torsion springs are fitted coaxially on the ends of the pivot-pin on each side of the cam to perform the biasing. Refitting of these springs is not easy when the cam and pivot-pin assembly is fitted in the trough.

OBJECT OF THE INVENTION

The object of invention consists in providing a clamp with a cam equipped with a bias spring that can be easily removed and refitted by the user without any risk of error or damage.

The clamp with a cam according to the invention is characterized in that the spring is integrated in a housing of the lever of the cam by means of a securing cassette configured to place the spring in a pre-stressed state, said cassette been provided with clip-fastening means designed to be accommodated in the housing of the lever.

According to a preferred embodiment, the cassette comprises an end-part for receiving the spring and flexible fingers coaxially surrounding the end-part for clip-fastening in the housing. The spring is formed by a torsion spring of spiral-wound type fitted around the end-part of the cassette.

The cassette is configured to collaborate with a stop of the lever to ensure securing thereof in a groove of the body. When the lever is inserted in the trough, the cassette engages in the groove of the body presenting a single possible assembly position.

The pivot-pin of the lever with cam is able to be disassembled by any fast mechanical fixing means.

BRIEF DESCRIPTION OF THE DRAWINGS

Other advantages and features will become more clearly apparent from the following description of an embodiment of the invention given for non-restrictive example purposes only and represented in the appended drawings, in which.

DESCRIPTION OF A PARTICULAR EMBODIMENT

Figure 1:
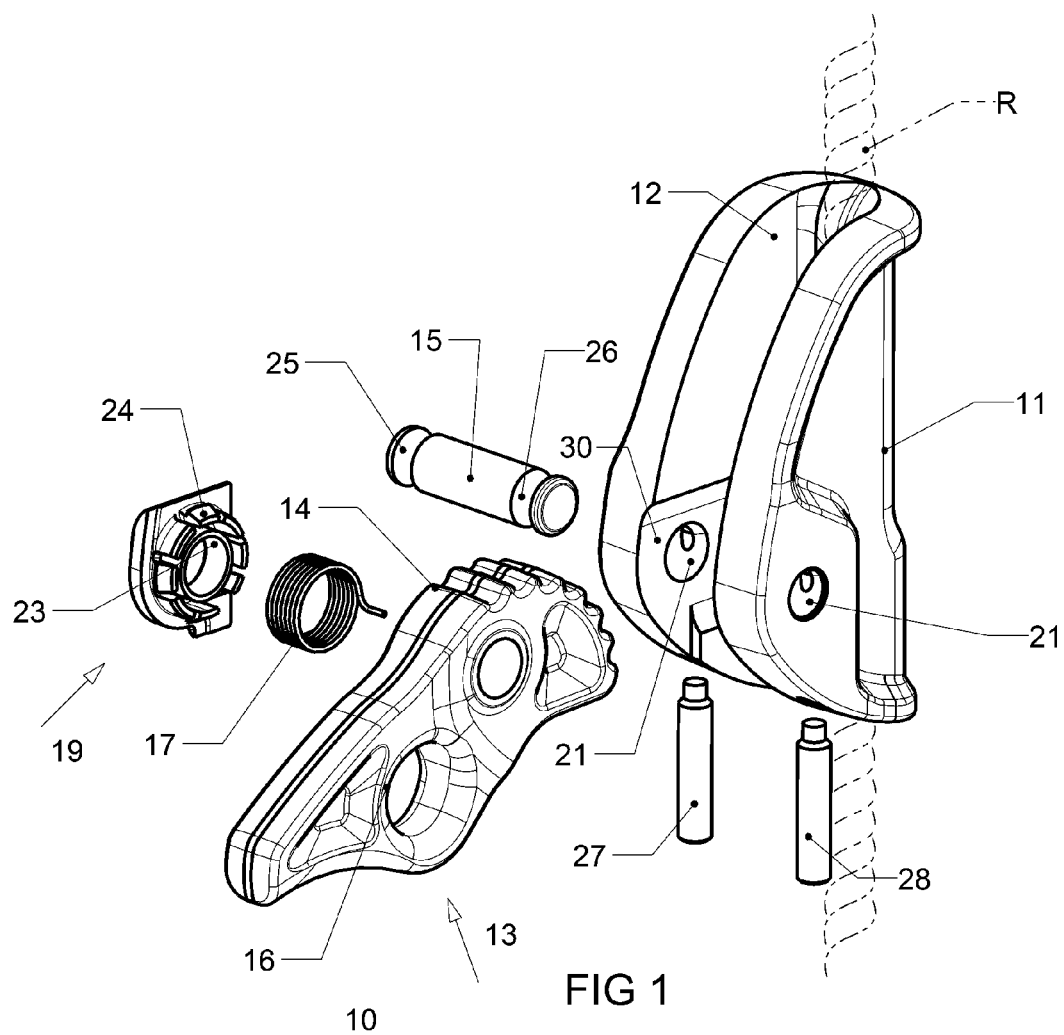
FIG. 1 is an exploded perspective view of the clamp according to the invention.
Figure 2:
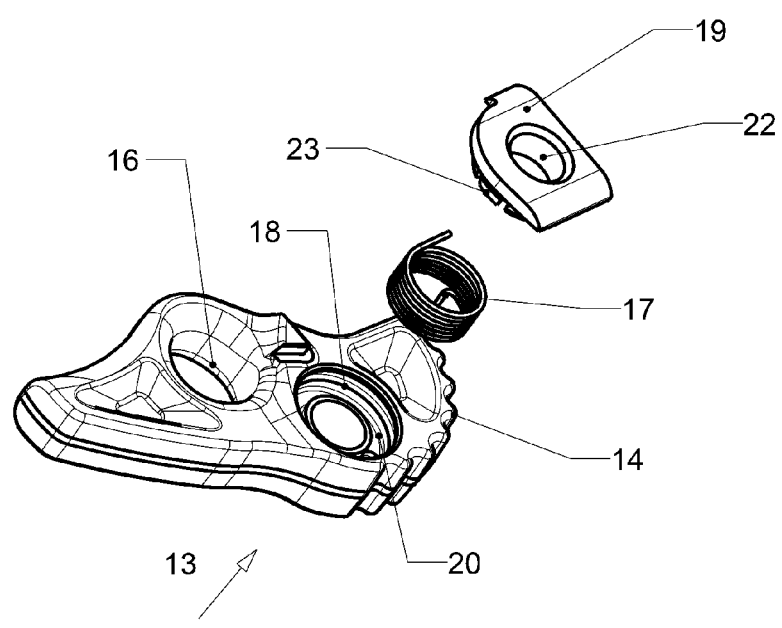
FIG. 2 is an exploded perspective view of the sub-assembly formed by the lever with a cam and the bias spring securing cassette.
Figure 3:
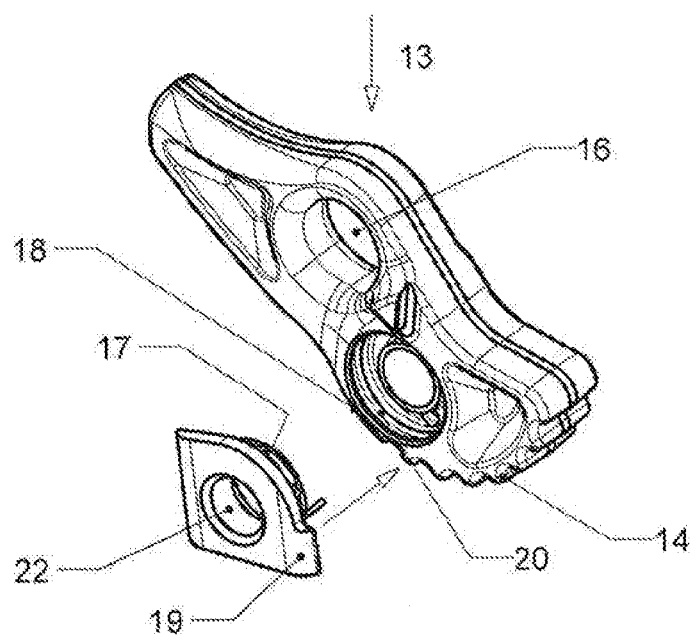
FIG. 3 represents a view of the sub-assembly of FIG. 2 with the cassette ready to be inserted in the housing of the lever.
Figure 4:
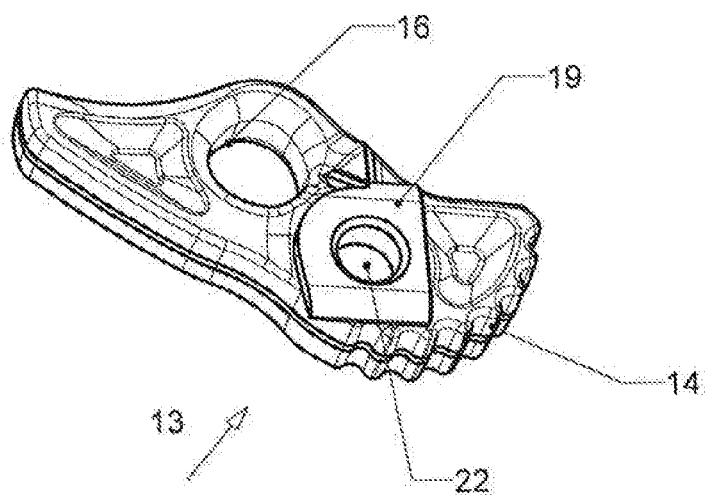
FIG. 4 shows a view of the sub-assembly of FIG. 3 after insertion in the housing.
Figure 5:
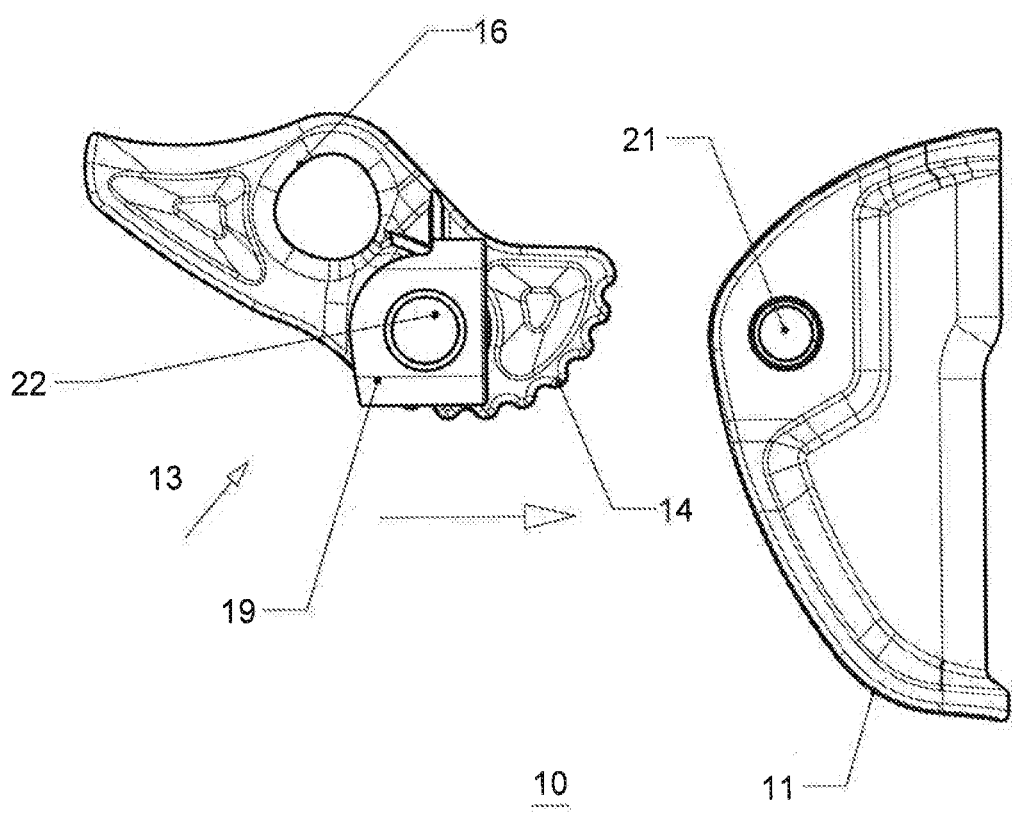
FIG. 5 represents a view of the sub-assembly of FIG. 4 when the latter is fitted in the trough of the body.
Figure 6:
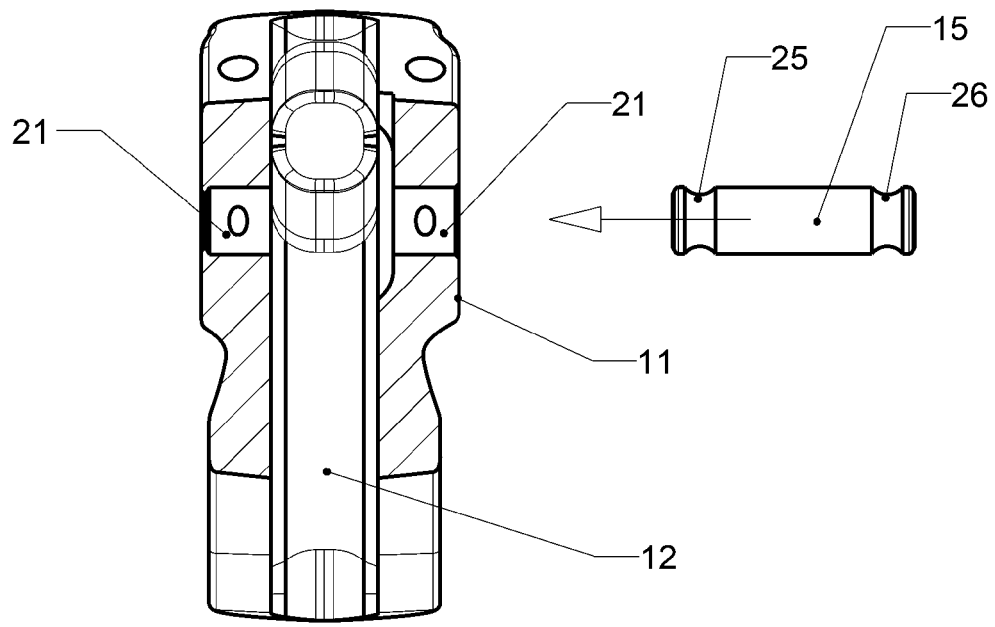
FIG. 6 is a front view of the trough of the body, before insertion of the pivot-pin of the lever.
Figure 7:
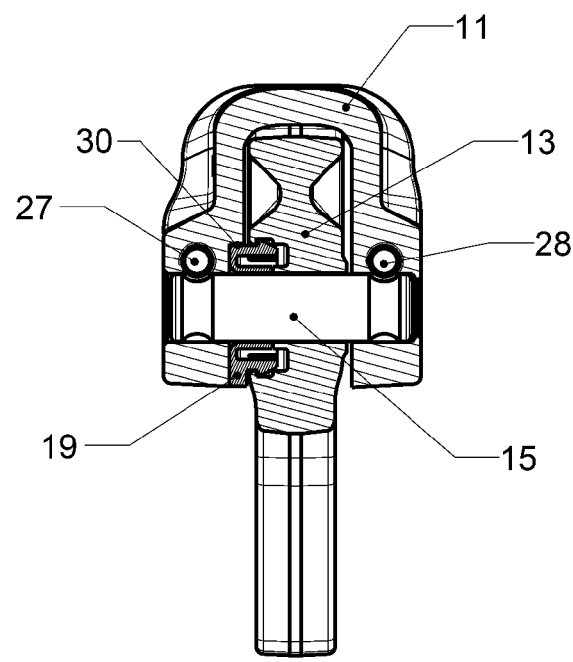
FIG. 7 illustrates a transverse cross-sectional view along the axis of the clamp.

With reference to FIGS. 1 to 7, a clamp 10 is designed for secured progression of a climber on a fixed rope R, and for forming reeving or hoisting systems. The clamp 10 comprises a U-shaped metal body 11 provided with a central trough 12 for passage of the rope R, and an actuating lever 13 with blocking cam 14.

The actuating lever 13 can swivel around a transverse pivot-pin 15 between a first jamming position and a second unblocking position of the rope R. The cam 14 extends at the inner end of the actuating lever 13 facing the bottom of the trough 12 so as to block the rope R against the bottom of the trough 12 in the first position. At the opposite end of the cam 14, the actuating lever 13 is provided with a circular aperture 16 accessible from the outside of the trough 12 for attaching a safety means (not shown) designed to be connected to the climber's harness.

The safety means can be a karabiner, a cord or a strap. The surface of the cam 14 coming into contact with the rope R can comprise a plurality of ribs or spikes to enhance the blocking effect. After the rope R has been inserted in the trough 12, the clamp 10 allows free upward movement of the climber and performs a blocking effect in the downwards direction. A bias spring 17, formed for example by a torsion spring, is arranged coaxially around the pivot-pin 15 to bias the actuating lever 13 and cam 14 to exert a slight pressure on the rope R.

The two parallel branches of the U-shaped body 11 comprise holes 21 aligned transversely for passage of the pivot-pin 15 of the clamp. The pivot-pin 15 is secured by removable fixing means, for example nuts and bolts, cotter-pins, telescopic ball-bearings, etc. . . .

According to the invention, the spring 17 is integrated in a circular housing 18 arranged in the actuating lever 13, being kept in place by means of a securing cassette 19. The housing 18 is situated between the end cam 14 and the attachment aperture 16, and presents a slightly larger diameter than that of the torsion spring 17. The bottom of the housing 18 is equipped with an annular rim 20 on which the spring 17 takes its bearing. Any other type of spring can naturally be used adjusting the configuration of the housing 18 accordingly.

The cassette 19 is preferably made from moulded plastic material and comprises a pass-through aperture 22 allowing passage of the pivot-pin 15. On one side, the cassette 19 presents a flat surface, and on the opposite side there extends an end-part 23 housing the spring 17. Flexible fingers 24 surround the end-part 23 coaxially to perform clip-fastening of the cassette 19 in the housing 18. Stops are provided on both sides of the cassette 19 to perform blocking of the latter in rotation once it has been inserted in the housing 18 with the spring 17.

The pivot-pin 15 presents a length corresponding to the distance separating the branches of the body 11 so as not to present any protrusion after it has been fitted. It is provided at its opposite ends with two annular grooves 25, 26 in which two quick-fastening cotter-pins 27, 28 engage.

Fitting of the spring 17 in the clamp 10 is performed in the following manner: The torsion spring 17 is first positioned around the tubular end-part 23 of the cassette 19, the cassette 19 is then turned through a fraction of a turn to place the spring 17 in a pre-stressed state, and the cassette with the spring 17 is then fitted by clip-fastening in the housing 18 of the lever 13. In this state, the cassette 19 protects the spring 17, and the assembly is blocked in rotation on the lever 13 of the cam 14.

The lever 13 of the cam 14 equipped with the securing cassette 19 of the spring 17 forms a sub-assembly designed to be inserted in the trough 12 of the body 11 making the aperture 22 of the cassette 19 coincide with the aligned holes 21 of the body 11. The cassette 19 engages in a groove 30 (FIGS. 1 and 7) of one of the branches of the body 11 presenting a single possible fitting position. In the inserted position in the groove 30, the cassette 19 is immobilised in rotation.

The pivot-pin 15 can then be inserted through the holes 21 and blocked transversely in the flange 11 by fitting of two quick-fastening cotter-pins 27, 28.

Figure 8:
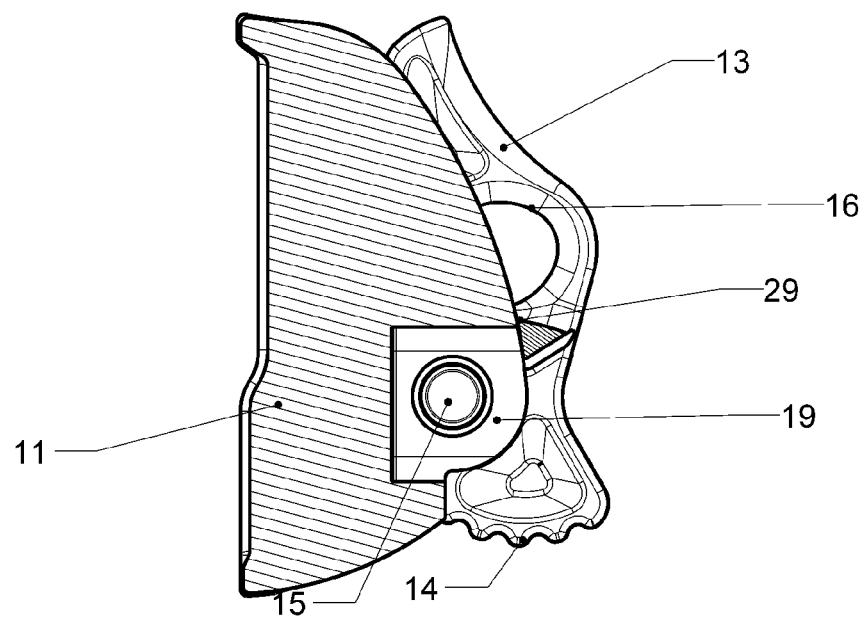
FIGS. 8 and 9 are vertical cross-sectional views of the clamp, with securing of the cassette, respectively in the open and blocked position of the cam.
Figure 9:
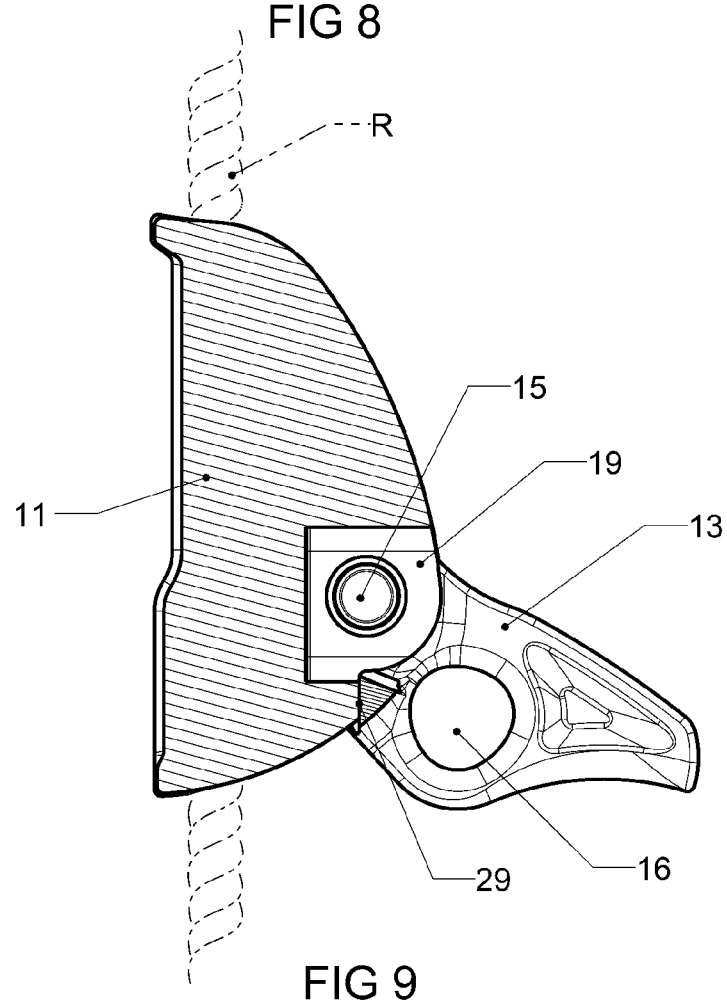

In FIGS. 8 and 9, a stop 29 of the lever 13 collaborates with a rounded edge of the cassette 19 to perform securing of the latter in the housing 18 throughout the pivoting travel of the lever 13 with cam 14 between the open position (FIG. 8) and the blocked position (FIG. 9).

After the pivot-pin 15 has been fitted, the clamp 10 is operational and the spring 17 in the pre-stressed state biases the cam 14 towards the rope R by pivoting around the pivot-pin 15.

Removal of the pivot-pin 15 is performed when the clamp 10 of the rope R is fitted or removed, the lever 13 of the cam 14 being able to be connected to the body 11 by means of a captive link, for example a cable or any other flexible link.

The invention claimed is:

1. A clamp on a rope comprising:
   a U-shaped body equipped with a trough for passage of the rope;
   an actuating lever having an aperture for attaching a safety means, and a cam for jamming the rope, said lever being housed in the trough by means of a removable pin;
   and a bias spring biasing the cam towards the rope,
   wherein the spring is integrated in a housing of the lever by means of a securing cassette configured to place the spring in a pre-stressed state, said cassette comprising an end-part for receiving the spring and flexible fingers coaxially surrounding the end-part for clip-fastening in the housing.

2. The clamp according to claim 1, wherein the cassette comprises an aperture for passage of the removable pin.

3. The clamp according to claim 1, wherein the spring is a torsion spring of spiral-wound type fitted around the end-part of the cassette.

4. The clamp according to claim 1, wherein the cassette is configured to collaborate with a stop of the lever to ensure securing thereof in a groove of the body.

5. The clamp according to claim 4, wherein, when the lever is inserted in the trough, the cassette engages in the groove of the body.

6. The clamp according to claim 1, wherein the cassette is made from molded plastic material.

7. The clamp according to claim 1, wherein the removable pin is able to be disassembled by a mechanical fixing means.

* * * * *